US008150203B2

(12) United States Patent
Someya et al.

(10) Patent No.: US 8,150,203 B2
(45) Date of Patent: Apr. 3, 2012

(54) LIQUID-CRYSTAL-DRIVING IMAGE PROCESSING CIRCUIT, LIQUID-CRYSTAL-DRIVING IMAGE PROCESSING METHOD, AND LIQUID CRYSTAL DISPLAY APPARATUS

(75) Inventors: Jun Someya, Tokyo (JP); Noritaka Okuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 192 days.

(21) Appl. No.: 12/730,865

(22) Filed: Mar. 24, 2010

(65) Prior Publication Data

US 2010/0177128 A1 Jul. 15, 2010

Related U.S. Application Data

(62) Division of application No. 11/579,694, filed as application No. PCT/JP2004/015396 on Oct. 19, 2004.

(30) Foreign Application Priority Data

Jun. 10, 2004 (JP) ................................ 2004-172634

(51) Int. Cl.
*G06K 9/40* (2006.01)

(52) U.S. Cl. ....................................................... 382/274

(58) Field of Classification Search ........................ None
See application file for complete search history.

(56) References Cited

U.S. PATENT DOCUMENTS 5,414,527 A * 5/1995 Koshi et al. .................. 382/239
5,425,114 A * 6/1995 Hamasaki et al. ............ 382/254
5,991,446 A * 11/1999 Terane .......................... 382/232
6,026,194 A * 2/2000 Torikai et al. ................. 382/232
6,052,488 A * 4/2000 Takahashi et al. ............ 382/239
6,269,183 B1 * 7/2001 Matoba et al. ................ 382/166
6,756,955 B2 6/2004 Someya et al.
7,034,788 B2 * 4/2006 Someya et al. ................. 345/89
7,209,106 B2 * 4/2007 Lu et al. ........................... 345/89
7,289,161 B2 * 10/2007 Yamakawa et al. ........... 348/607
7,327,340 B2 * 2/2008 Someya et al. ................. 345/89
7,403,183 B2 * 7/2008 Someya .......................... 345/98
7,596,178 B2 * 9/2009 Adachi et al. ............ 375/240.15
7,639,312 B2 * 12/2009 Baba et al. ..................... 348/790
7,676,111 B2 * 3/2010 Yamauchi ...................... 382/275
2002/0033813 A1 * 3/2002 Matsumura et al. .......... 345/204
(Continued)

FOREIGN PATENT DOCUMENTS

JP 4-204593 A 7/1992
(Continued)

*Primary Examiner* — Yuzhen Ge
(74) *Attorney, Agent, or Firm* — Birch, Stewart, Kolasch & Birch, LLP

(57) ABSTRACT

In a liquid-crystal-driving image processing circuit that encodes and decodes image data to reduce the frame memory size, the present invention has the object of providing a liquid-crystal-driving image processing circuit capable of correcting image data accurately and applying appropriately corrected voltages to the liquid crystal without being affected by encoding or decoding errors, even when moving images are input. To achieve the above object, the liquid-crystal-driving image processing circuit according to the present invention takes a difference between first decoded image data corresponding to the image in the current frame and second decoded image data corresponding to preceding-frame image data, selects either the image data of the current frame or the second decoded image data for each pixel on the basis of the difference, thereby generates preceding-frame image data, and corrects the gray-scale values of the image of the current frame on the basis of the preceding-frame image data and the image data of the current frame.

3 Claims, 14 Drawing Sheets

U.S. PATENT DOCUMENTS

| | | | | |
|---|---|---|---|---|
| 2002/0050965 | A1* | 5/2002 | Oda et al. | 345/87 |
| 2002/0140652 | A1* | 10/2002 | Suzuki et al. | 345/87 |
| 2003/0080983 | A1* | 5/2003 | Someya et al. | 345/690 |
| 2003/0231158 | A1* | 12/2003 | Someya et al. | 345/101 |
| 2004/0066847 | A1* | 4/2004 | Adachi et al. | 375/240.13 |
| 2004/0189565 | A1* | 9/2004 | Someya | 345/87 |
| 2004/0247199 | A1* | 12/2004 | Murai et al. | 382/274 |
| 2005/0084161 | A1* | 4/2005 | Mishima | 382/232 |

FOREIGN PATENT DOCUMENTS

| | | | |
|---|---|---|---|
| JP | 6-189232 | | 7/1994 |
| JP | 9-81083 | | 3/1997 |
| JP | 2616652 | B2 | 3/1997 |
| JP | 3041951 | B2 | 3/2000 |
| JP | 2002-297104 | A | 10/2002 |
| JP | 2003-202845 | A | 7/2003 |

* cited by examiner

PRECEDING FRAME

FIG.3(a)

| | A | B | C | D |
|---|---|---|---|---|
| a | 12 | 12 | 22 | 22 |
| c | 12 | 12 | 22 | 22 |
| b | 8 | 8 | 18 | 18 |
| d | 8 | 8 | 18 | 18 |

ACTUAL IMAGE DATA Di0

FIG.3(b)

La=15 Lb=10

| | | | |
|---|---|---|---|
| 0 | 0 | 1 | 1 |
| 0 | 0 | 1 | 1 |
| 0 | 0 | 1 | 1 |
| 0 | 0 | 1 | 1 |

ENCODED IMAGE DATA Da0

FIG.3(c)

| | A | B | C | D |
|---|---|---|---|---|
| a | 10 | 10 | 20 | 20 |
| c | 10 | 10 | 20 | 20 |
| b | 10 | 10 | 20 | 20 |
| d | 10 | 10 | 20 | 20 |

DECODED IMAGE DATA Db0

CURRENT FRAME

FIG.3(d)

| | A | B | C | D |
|---|---|---|---|---|
| a | 12 | 10 | 68 | 68 |
| c | 12 | 10 | 68 | 68 |
| b | 8 | 10 | 72 | 72 |
| d | 8 | 10 | 72 | 72 |

CURRENT IMAGE DATA Di1

FIG.3(e)

La=40 Lb=60

| | | | |
|---|---|---|---|
| 0 | 0 | 1 | 1 |
| 0 | 0 | 1 | 1 |
| 0 | 0 | 1 | 1 |
| 0 | 0 | 1 | 1 |

ENCODED IMAGE DATA Da1

FIG.3(f)

| | A | B | C | D |
|---|---|---|---|---|
| a | 10 | 10 | 70 | 70 |
| c | 10 | 10 | 70 | 70 |
| b | 10 | 10 | 70 | 70 |
| d | 10 | 10 | 70 | 70 |

DECODED IMAGE DATA Db1

FIG.3(g)

| | A | B | C | D |
|---|---|---|---|---|
| a | 0 | −2 | 46 | 46 |
| c | 0 | −2 | 46 | 46 |
| b | 0 | 2 | 54 | 54 |
| d | 0 | 2 | 54 | 54 |

ACTUAL CHANGE

FIG.3(h)

| | A | B | C | D |
|---|---|---|---|---|
| a | 0 | 0 | 50 | 50 |
| c | 0 | 0 | 50 | 50 |
| b | 0 | 0 | 50 | 50 |
| d | 0 | 0 | 50 | 50 |

CHANGE Dv1

FIG.3(i)

| | A | B | C | D |
|---|---|---|---|---|
| a | 0 | 2 | 4 | 4 |
| c | 0 | 2 | 4 | 4 |
| b | 0 | −2 | −4 | −4 |
| d | 0 | −2 | −4 | −4 |

FIRST ERROR IN CHANGE

FIG.3(j)

| | A | B | C | D |
|---|---|---|---|---|
| a | 12 | 10 | 20 | 20 |
| c | 12 | 10 | 20 | 20 |
| b | 8 | 10 | 20 | 20 |
| d | 8 | 10 | 20 | 20 |

PRECEDING-FRAME IMAGE DATA Dq0

FIG.3(k)

| | A | B | C | D |
|---|---|---|---|---|
| a | 0 | 0 | 48 | 48 |
| c | 0 | 0 | 48 | 48 |
| b | 0 | 0 | 52 | 52 |
| d | 0 | 0 | 52 | 52 |

CHANGES BETWEEN PRECEDING-FRAME DATA Dq0 AND CURRENT IMAGE DATA Di1

FIG.3(l)

| | A | B | C | D |
|---|---|---|---|---|
| a | 0 | 2 | 2 | 2 |
| c | 0 | 2 | 2 | 2 |
| b | 0 | −2 | −2 | −2 |
| d | 0 | −2 | −2 | −2 |

SECOND ERROR IN CHANGE

LIQUID-CRYSTAL-DRIVING IMAGE PROCESSING CIRCUIT, LIQUID-CRYSTAL-DRIVING IMAGE PROCESSING METHOD, AND LIQUID CRYSTAL DISPLAY APPARATUS

This application is a Divisional of copending application Ser. No. 11/579,694 filed on Nov. 6, 2006, which is a National Phase of PCT International Application No. PCT/JP2004/015396 filed on Oct. 19, 2004, which claims the benefit of Japanese Patent Application No. 2004-172634 filed in Japan, on Jun. 10, 2004. The entire contents of all of the above applications is hereby incorporated by reference.

FIELD OF THE INVENTION

The present invention relates to a liquid crystal display apparatus, and more particularly to an image processing circuit and image processing method for driving a liquid crystal so as to improve the response speed of the liquid crystal.

BACKGROUND ART

Liquid crystal panels are thin and lightweight, so they are widely used in display apparatus such as the display units of television receivers, computers, and mobile information terminals. However, they have the drawback of being incapable of dealing with rapidly changing moving pictures, because after application of a driving voltage, it takes some time for the desired transmittance to be reached. To solve this problem, a driving method that applies an excess voltage to the liquid crystal when the gray-scale value changes from frame to frame, so that the liquid crystal reaches the desired transmittance within one frame, is adopted in Japanese Patent No. 2616652. More specifically, the image data of the current frame are compared pixel by pixel with the image data one frame before, and when there is a change in the gray-scale value, a correction corresponding to the change is added to the image data of the current frame. When the gray-scale values increases in comparison with the preceding frame, a driving voltage higher than the normal driving voltage is thereby applied to the liquid crystal panel; when the gray-scale value decreases, a driving voltage lower than the normal driving voltage is applied.

To practice the above method, it is necessary to have a frame memory from which to output the image data of the preceding frame. With the increasing numbers of pixels displayed on today's large liquid crystal panels, it becomes necessary to have an increasingly large frame memory. As the number of pixels increases, the amount of data that must be written into and read from the frame memory within a given time (within one frame interval, for example) also increases, so the frequency of the clock that controls the reading and writing of data and the data transfer rate must be increased. The increased size and transfer rate of the frame memory drive up the cost of the liquid crystal display apparatus.

To solve this problem, the image processing method for driving a liquid crystal described in Japanese Patent Application Publication No. 2003-202845 reduces the size of the frame memory by encoding the image data before storing the image data in the frame memory. By correcting the image data on the basis of a comparison between decoded image data for the current frame obtained by decoding the encoded image data and decoded image data for the preceding frame obtained by delaying the encoded image data for one frame interval before decoding, it can also avoid the unnecessary application of excessive voltages associated with encoding and decoding errors when a still image is input.

In the image processing method for driving a liquid crystal described in Japanese Patent Application Publication No. 2003-202845, however, since the corrections are determined from comparisons of decoded image data, depending on the way in which the image changes between frames, encoding and decoding errors may become prominently apparent in the corrected image data. When the corrections to the image data are affected by encoding and decoding errors, unnecessary excessive voltages are applied to the liquid crystal, and the problem of degraded quality of moving images arises.

The present invention addresses the above problems with the object, in a liquid-crystal-driving image processing circuit that encodes and decodes image data to reduce the frame memory size, of providing a liquid-crystal-driving image processing circuit capable of correcting image data accurately and applying appropriately corrected voltages to the liquid crystal without being affected by encoding or decoding errors, even when moving images are input.

DISCLOSURE OF THE INVENTION

A first liquid-crystal-driving image processing apparatus and image processing method according to the present invention encodes image data representing a current frame of an image, thereby outputs encoded image data corresponding to the image in the current frame, takes a difference, for each pixel, between first decoded image data obtained by decoding the encoded image data and second decoded image data obtained by delaying the encoded image data for an interval corresponding to one frame and then decoding the encoded image data, generates preceding-frame image data by selecting either the image data of the current frame or the second decoded image data for each pixel according to the difference, and corrects the gray-scale values of the image in the current frame according to the preceding-frame image data and the image data of the current frame.

BRIEF DESCRIPTION OF THE DRAWINGS

FIGS. 3(*a*), 3(*b*), 3(*c*), 3(*d*), 3(*e*), 3(*f*), 3(*g*), 3(*h*), 3(*i*), 3(*j*), 3(*k*), and 3(*l*) illustrate encoding and decoding errors.

BEST MODE OF PRACTICING THE INVENTION

Embodiments of the invention will now be described with reference to the attached drawings.

First Embodiment

Figure 1:
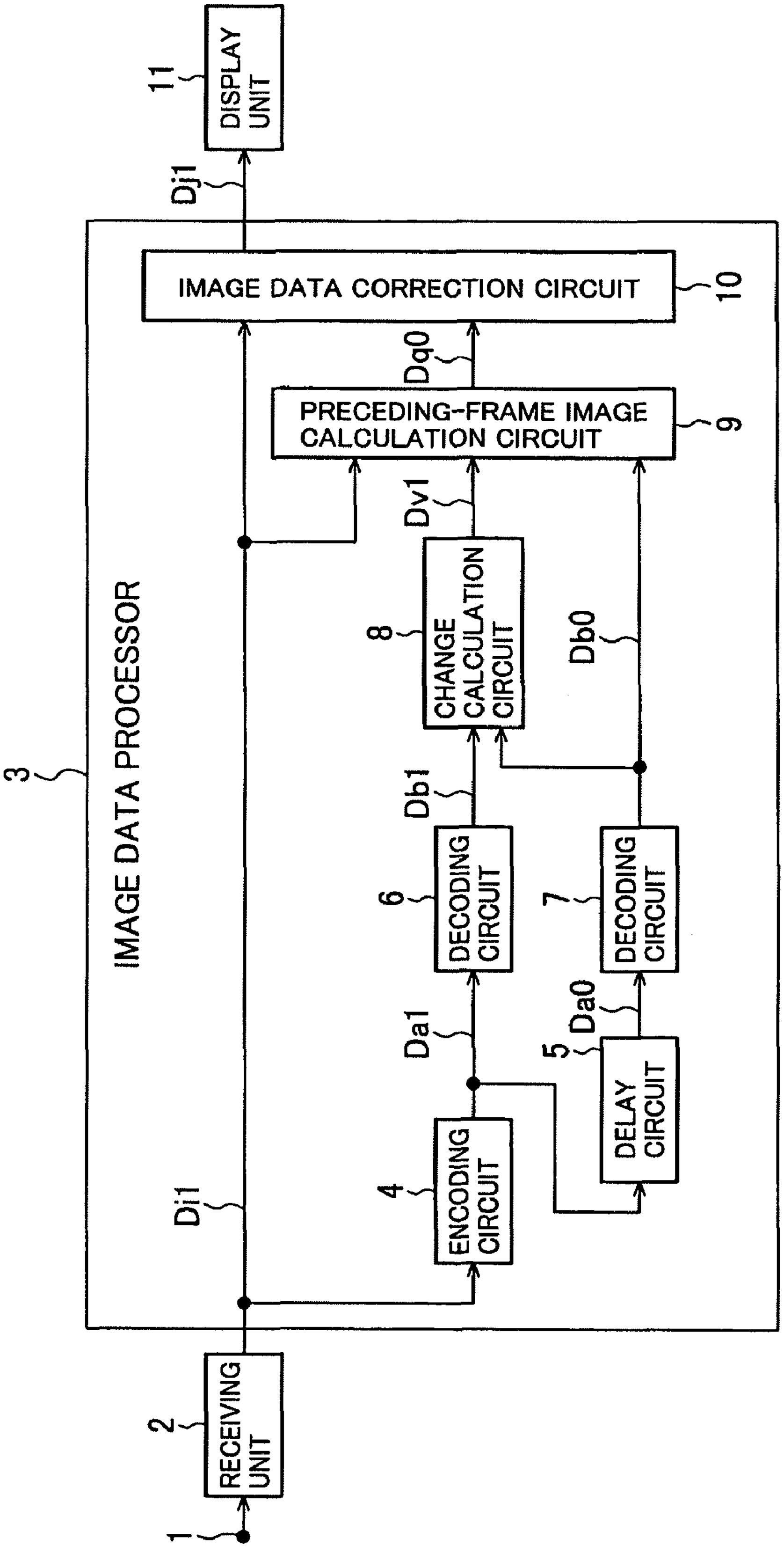
FIG. 1 is a block diagram showing an embodiment of a liquid crystal image processing circuit according to the present invention.

FIG. 1 is a block diagram showing the structure of a liquid crystal display apparatus having an image processing circuit for driving a liquid crystal according to the present invention. A receiving unit 2 carries out processing including tuning and decoding of a video signal input through an input terminal 1, then sequentially outputs current image data Di1 representing one frame of an image (the image in the current frame) to an image data processor 3. The image data processor 3 comprises an encoding circuit 4, a delay circuit 5, decoding circuits 6, 7, a change calculation circuit 8, a preceding-frame image calculation circuit 9, and an image data correction circuit 10. The image data processor 3 corrects the image data Di1 according to changes in gray-scale values, and outputs the corrected image data Dj1 to a display unit 11. The display unit 11 applies driving voltages defined by the corrected image data Dj1, thereby displaying the image.

The operation of the image data processor 3 will now be described.

The encoding circuit 4 reduces the data size by encoding the current image data Di1 and outputs encoded image data Da1. Block truncation coding (BTC) methods such as FBTC or GBTC can be used to encode the data. Any still-picture encoding method can also be used, including two-dimensional discrete cosine transform encoding methods such as JPEG, predictive encoding methods such as JPEG-LS, and wavelet transform methods such as JPEG 2000. These still-image encoding methods can be used even though they are non-reversible, so that the image data before encoding and the decoded image data are not completely identical.

The delay circuit 5 delays the encoded image data Da1 for one frame interval, thereby outputting the encoded image data Da0 of the preceding frame. The higher the encoding ratio (data compression ratio) of the image data Di1 in the encoding circuit 4, the more the memory size of the delay circuit 5 needed to delay the encoded image data Da1 can be reduced.

Decoding circuit 6 decodes the encoded image data Da1, thereby outputting decoded image data Db1 corresponding to the current image data Di1. Decoding circuit 7 decodes the encoded image data Da0 delayed by an interval corresponding to one frame by the delay circuit 5, thereby outputting decoded image data Db0 representing the image in the preceding frame, one frame before.

The change calculation circuit 8 takes the difference between the decoded image data Db1 corresponding to the image data of the current frame and the decoded image data Db0 corresponding to the image data of the preceding frame pixel by pixel, and outputs the absolute value of the difference as the change Dv1. The change Dv1 is input to the preceding-frame image calculation circuit 9, together with the current image data Di1 and the decoded image data Db0.

The preceding-frame image calculation circuit 9 selects the decoded image data Db0 as the image data for the preceding frame for a pixel at which the change Dv1 is greater than a certain threshold SH0, and selects the current image data Di1 as the image data for the preceding frame for a pixel at which the change Dv1 is less than the threshold SH0, thereby generating preceding-frame image data Dq0. The preceding-frame image data Dq0 are input to the image data correction circuit 10.

Figure 2A:
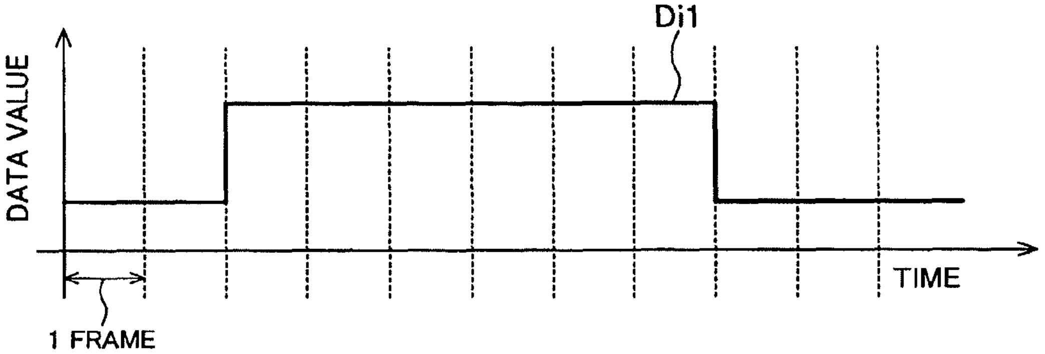
FIGS. 2(*a*), 2(*b*) and 2(*c*) are graphs illustrating liquid crystal response characteristics.
Figure 2B:
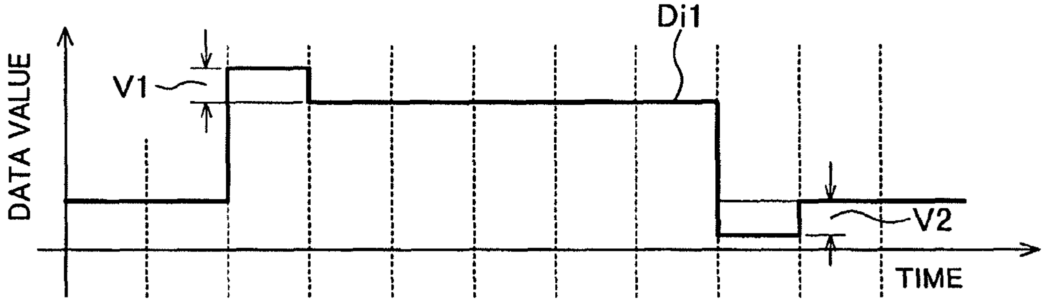
Figure 2C:
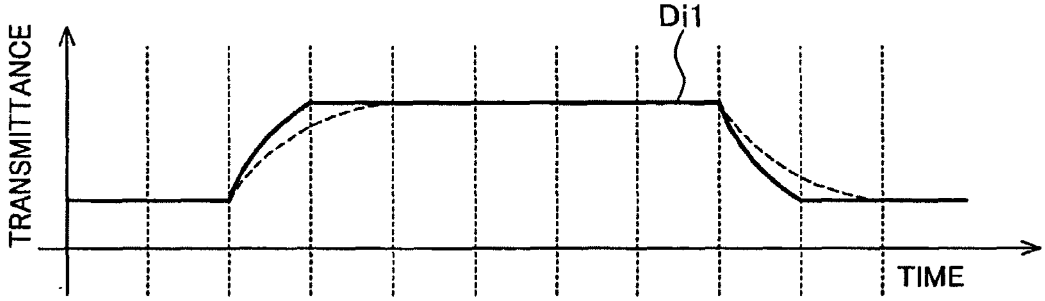

The image data correction circuit 10 corrects the image data Di1 in accordance with the changes in the gray-scale values over an interval of one frame, obtained from a comparison of the current image data Di1 with the preceding-frame image data Dq0, so as to cause the liquid crystal to reach the transmittance specified by the image data Di1 within a one-frame interval, and outputs the corrected image data Dj1. FIGS. 2(*a*), 2(*b*), and 2(*c*) illustrate response characteristics when a driving voltage based on the corrected image data Dj1 is applied to the liquid crystal. FIG. 2(*a*) shows the current image data Di1, FIG. 2(*b*) shows the corrected image data Dj1, and FIG. 2(*c*) shows the liquid crystal response curve obtained by applying a driving voltage based on image data Dj1. The dashed curve in FIG. 2(*c*) also shows the liquid crystal response when a driving voltage is applied according to the current image data Di1. When the gray-scale value increases and decreases, corrections V1 and V2 are added to and subtracted from the current image data Di1 to generate the corrected image data Dj1 as shown in FIG. 2(*b*). Application of a driving voltage based on the corrected image data Dj1 to the liquid crystal can cause the liquid crystal to reach the transmittance specified by the current image data Di1 within substantially one frame interval, as shown in FIG. 2(*c*).

The liquid-crystal-driving image processing circuit of the present invention calculates the change Dv1 between the decoded image data Db1 of the current frame and the decoded image data Db0 of the preceding frame pixel by pixel, selects the decoded image data Db0 as the image data of the preceding frame for a pixel at which the change Dv1 is greater than the threshold SH0, and selects the current image data Di1 as the image data of the preceding frame for a pixel at which the change Dv1 is less than the threshold SH0, thereby generating the preceding-frame image data Dq0, and generates the corrected image data Dj1 on the basis of a comparison of the preceding-frame image data Dq0 with the current image data Di1. The effect of encoding and decoding errors in the encoding circuit 4 and decoding circuits 6, 7 can thereby be reduced.

FIGS. 3(*a*) to 3(*l*) illustrate the effect of encoding and decoding errors. FIG. 3(*a*) shows the true values of the image data Di0 of the preceding frame; FIG. 3(*d*) shows the image data Di1 of the current frame. FIGS. 3(*b*) and 3(*e*) show the encoded data obtained by FTBC encoding of the image data Di0 of the preceding frame and the image data Di1 of the current frame shown in FIGS. 3(*a*) and 3(*d*), respectively (using 8-bit representative values (La and Lb) and allocating one bit to each encoded pixel). FIGS. 3(*c*) and 3(*f*) show the decoded image data Db0 of the preceding frame and the decoded image data Db1 of the current frame, obtained by decoding the encoded data shown in FIGS. 3(*b*) and 3(*e*), respectively.

FIG. 3(*g*) shows the actual changes between the two frames, i.e., the differences between the image data Di0 and Di1 shown in FIGS. 3(*a*) and 3(*b*). FIG. 3(*h*) shows the changes Dv1 between the decoded image data Db0 and Db1 shown in FIGS. 3(*c*) and 3(*f*). FIG. 3(*i*) shows first errors between the actual frame-to-frame changes shown in FIG. 3(*g*) and the changes Dv1 shown in FIG. 3(*h*) between the decoded images. As shown in FIG. 3(*h*), for the pixels in the first column, where the gray-scale values do not change between the two frames, the changes Dv1 match the actual changes between the two images without error, but for the pixels in the second to fourth columns, where the gray-scale values change between the two frames, errors occur: the changes Dv1 differ from the actual changes. That is, the effect of encoding and decoding errors becomes apparent.

FIG. 3(*j*) shows the values of the preceding-frame image data Dq0, output by selecting either the current image data Di1 or the decoded image Db0 in accordance with the comparison between the changes Dv1 shown in FIG. 3(*h*) and the threshold SH0. The threshold SH0 for selecting the preceding-frame image data Dq0 is assumed to be ten (10). As described earlier, the preceding-frame image calculation circuit 9 selects the current image data Di1 as the image data of the preceding frame if the change Dv1 is less than the threshold SH0 and selects the decoded image data Db0 if the change Dv1 is greater than the threshold SH0. This selection is made pixel by pixel. Accordingly, the current image data Di1 shown in FIG. 3(*d*) are selected as the preceding-frame image data Dq0 for the pixels in the first and second columns, where the changes Dv1 are zero (0). The decoded image data Db0 shown in FIG. 3(*c*) are selected as the preceding-frame image data Dq0 for the pixels in the third and fourth columns, where the changes Dv1 are fifty (50).

FIG. 3(*k*) shows the changes between the image data Dq0 selected to represent the image of the preceding frame as shown in FIG. 3(*j*) and the current image data Di1 shown in FIG. 3(*d*). FIG. 3(*l*) shows second errors indicating the differences between the changes shown in FIG. 3(*k*), between the image data Dq0 selected for the preceding frame and the current image data Di1, and the actual changes shown in FIG. 3(*g*). The second errors shown in FIG. 3(*l*), in the values of the changes between the preceding-frame image data Dq0 and the current image data Di1, are smaller than the first errors shown in FIG. 3(*i*), in the changes between the decoded image data Db0 and Db1. The corrected image data Dj1 are output in accordance with the changes between the current image data Di1 and the preceding-frame image data generated by selecting either the current image data Di1 or the decoded image data Db0 on the basis of the changes Dv1, so the effect of the encoding and decoding errors in areas where the gray-scale values change from one frame to the next can be reduced, and more accurate corrected image data Dj1 can be obtained.

Figure 4:
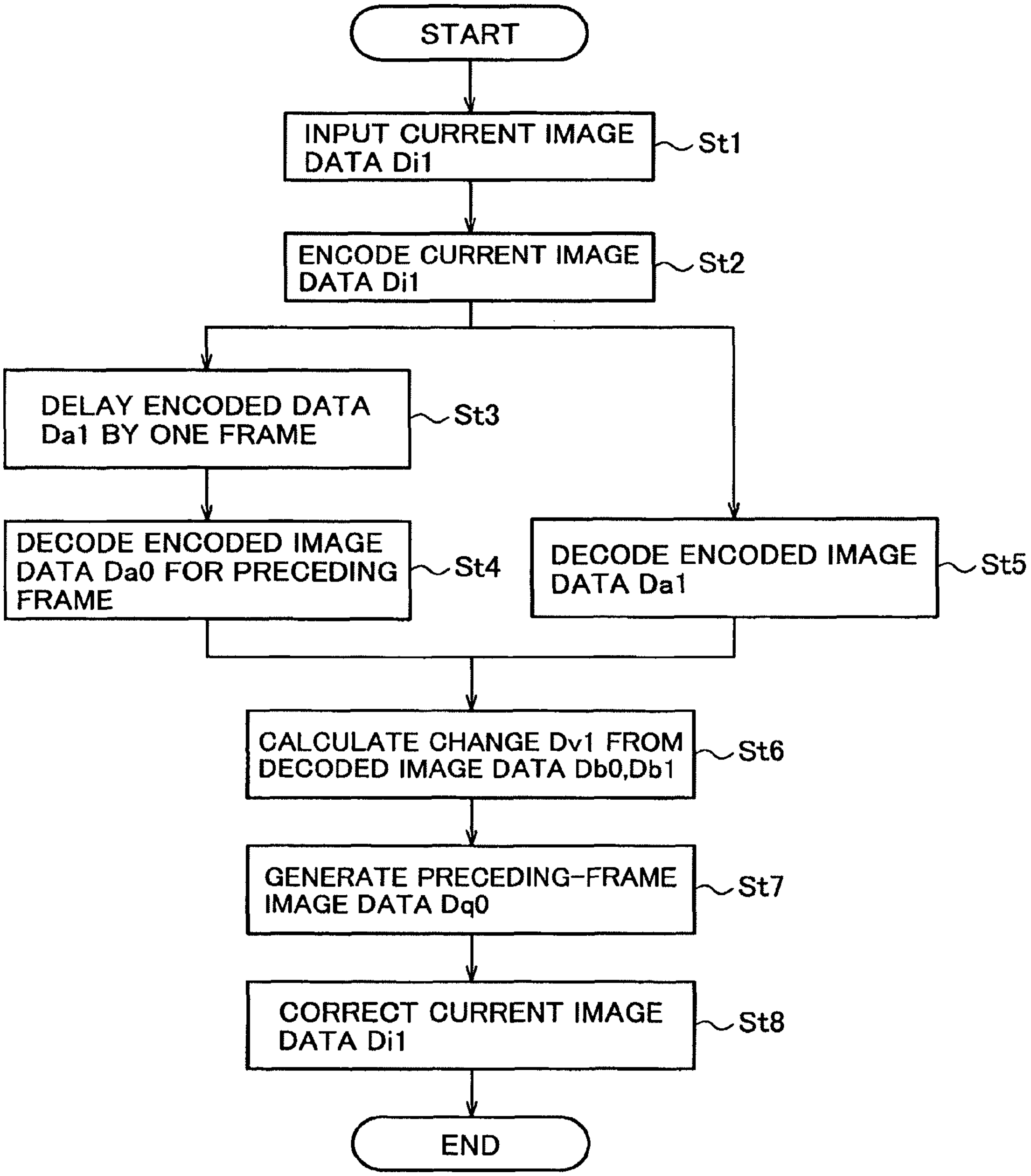
FIG. 4 is a flowchart illustrating the operation of a liquid-crystal-driving image processing circuit according to the present invention.

FIG. 4 is a flowchart illustrating the operation of a liquid-crystal-driving image processing circuit according to the first embodiment.

First, the current image data Di1 are input to the image data processor 3 (St1). The encoding circuit 4 encodes the input current image data Di1 and outputs encoded image data Da1 (St2). The delay circuit 5 delays the encoded image data Da1 by one frame interval and outputs encoded image data Da0 for the preceding frame (St3). The decoding circuit b7 decodes the encoded image data Da0 and outputs decoded image data Db0 corresponding to the current image data Di0 one frame before (St4). In parallel with these steps, decoding circuit 6 decodes the encoded image data Da1 and outputs decoded image data Db1 corresponding to the current image data Di1 of the current frame (St5).

The change calculation circuit 8 obtains the difference between the decoded image data Db0 of the preceding frame and the decoded image data Db1 of the current frame pixel by pixel and outputs the absolute value of the difference as the change Dv1 (St6). The preceding-frame image calculation circuit 9 compares the change Dv1 and the threshold SH0, selects the current image data Di1 for a pixel at which the change Dv1 is less than the threshold SH0, selects the decoded image data Db0 for a pixel at which the change Dv1 is greater than the threshold SH0, and outputs the selected data as the preceding-frame image data Dq0 (St7).

The image data correction circuit 10 obtains the corrections needed to cause the liquid crystal to reach the transmittance specified by the current image data Di1 within one frame interval, in accordance with the changes in gray-scale values obtained by comparing the preceding-frame image data Dq0 and the current image data Di0, corrects the current image data Di1 by using these corrections, and outputs the corrected image data Dj1 (St8).

The procedure from St1 to St8 is carried out for each pixel of the current image data Di1.

The liquid-crystal-driving image processing circuit according to the first embodiment obtains the change Dv1 between the decoded image data Db1 of the current frame and the decoded image data Db0 of the preceding frame pixel by pixel, selects the decoded image data Db0 for a pixel at which the change Dv1 is greater than the threshold SH0, selects the current image data Di1 for a pixel at which the change Dv1 is less than the threshold SH0, thereby generates preceding-frame image data Dq0, compares the preceding-frame image data Dq0 and the current image data Di1, and generates the corrected image data Dj1 accordingly. When a still image is input, the changes Dv1 are zero, and no correction is made. When moving images are input, corrections based on the difference between the current image data Di1 and the decoded image data Db0 are calculated for pixels at which the change Dv1 is greater than the threshold SH0, so that accurate corrected image data Dj1 can be obtained, as shown in FIGS. 3(*a*) to 3(*l*), without being affected by encoding or decoding errors. Therefore, the liquid crystal response speed can be controlled appropriately without unnecessarily applying excess voltages, irrespective of whether a still or moving image is input.

Alternatively, the preceding-frame image data Dq0 may be calculated by the following formula (1).

$$Dq0 = k \times Db0 + (1-k) \times Di1 \tag{1}$$

Figure 5:
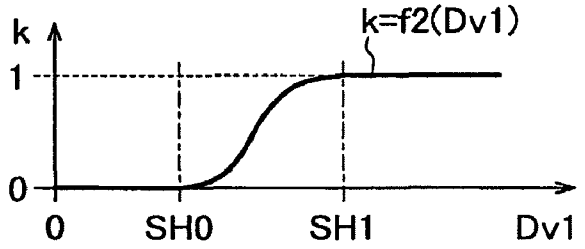
FIG. 5 is a graph of values of a multiplicative coefficient k.

In formula (1), k is a coefficient based on the change Dv1. FIG. 5 is a graph showing the relationship between the coefficient k and the change Dv1. As shown in FIG. 5, two thresholds SH0 and SH1 (SH0<SH1) are specified for the change Dv1. If Dv1<SH0, then k=0 and the current image data Di1 are selected as the preceding-frame image data Dq0. If Dv1>SH1, then k=1 and the decoded image data Db0 are output as the preceding-frame image data Dq0. If SH0≦Dv1≦SH1, then 0≦k≦1 and a weighed average of the current image data Di1 and the decoded image data Db0 is calculated as the preceding-frame image data Dq0.

Ideal preceding-frame image data Dq0 can be obtained by using formula (1), with reduced error even if the change Dv1 is close to the threshold.

Second Embodiment

In the first embodiment, the image data correction circuit 10 calculates corrections in accordance with changes in the gray-scale values obtained from a comparison of the preceding-frame image data Dq0 with the current image data Di1, thereby generating the corrected image data Dj1. The image data correction means may however include a storage means such as a lookup table and may correct the current image data Di0 by using corrections read from the storage means and output the corrected image data Dj1.

Figure 6:
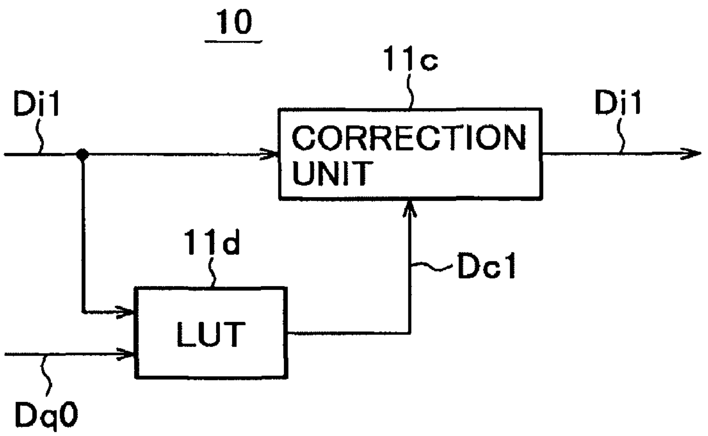
FIG. 6 is a block diagram showing an exemplary internal structure of the image data correction circuit.

FIG. 6 is a block diagram showing the internal structure of the image data correction circuit 10 according to the second embodiment. The lookup table 11*d* receives the preceding-frame image data Dq0 and the current image data Di1 and outputs a correction Dc1 obtained from the two inputs.

Figure 7:
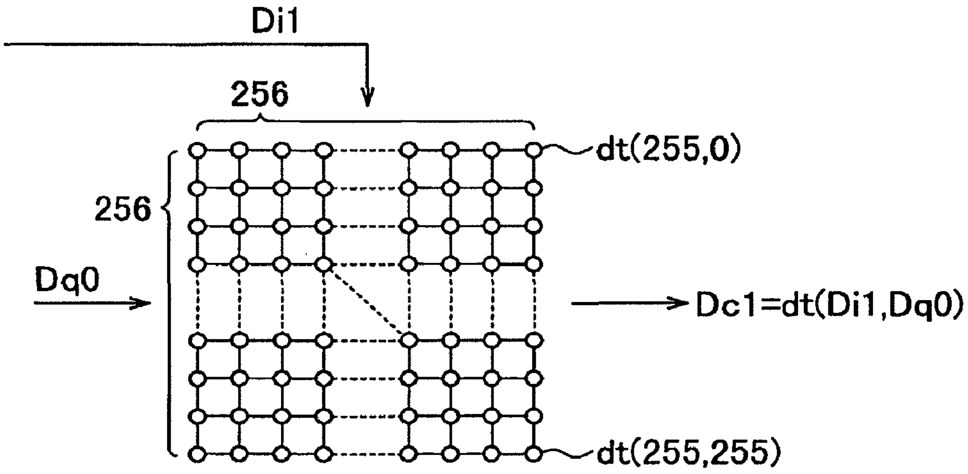
FIG. 7 is a schematic drawing showing the structure of a lookup table.

FIG. 7 is a schematic drawing showing an exemplary structure of the lookup table 11*d*. The lookup table 11*d* receives the current image data Di1 and the preceding-frame image data Dq0. If both the current image data Di1 and the preceding-frame image data Dq0 have 8-bit values, the lookup table 11*d* stores 256×256 data values as corrections Dc1. The lookup table 11*d* reads and outputs the correction Dc1=dt(Di1, Dq0) corresponding to the values of the current image data Di1 and the preceding-frame image data Dq0. The correction unit 11*c* adds the correction Dc1 output from the lookup table 11*d* to the current image data Di1, thereby outputting the corrected image data Dj1.

Figure 8:
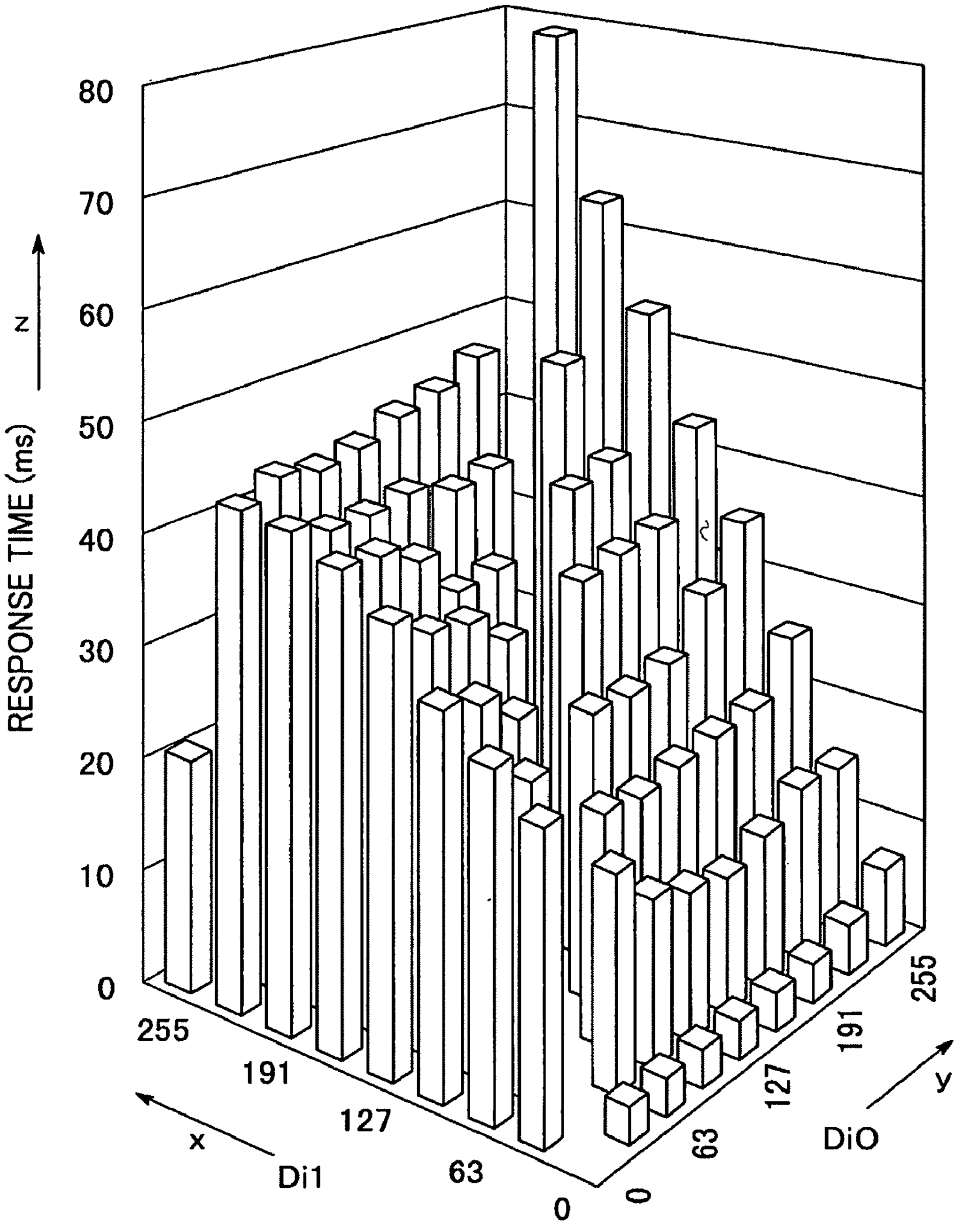
FIG. 8 is a graph showing an example of liquid crystal response speed.

FIG. 8 is a graph showing an example of liquid crystal response speed, the x-axis representing the values of the current image data Di1 (gray-scale values in the current image), the y-axis representing the values of the image data Di0 of the preceding frame (gray-scale values in the preceding-frame image), and the z-axis representing the response times needed to cause the liquid crystal to change from transmittances corresponding to gray-scale values in the preceding frame to transmittances corresponding to gray-scale values of the current image data Di1. If the current image data have 8-bit gray-scale values, there are 256×256 combinations of gray-scale values of the current image data and the preceding-frame image data, and consequently there are 256×256 different response times. FIG. 8 is simplified to show only 8×8 of the response times corresponding to combinations of the gray-scale values.

Figure 9:
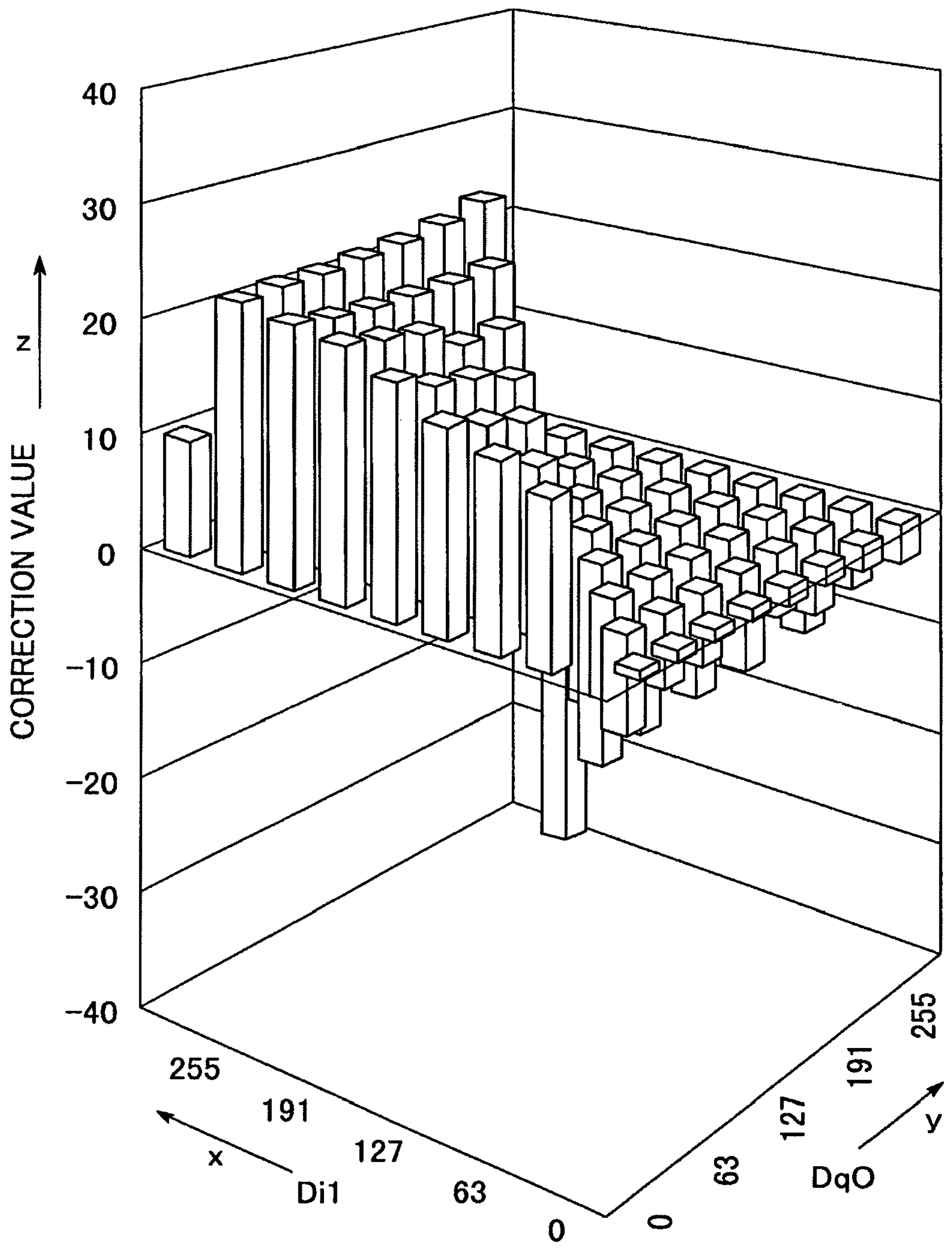
FIG. 9 is a graph showing an example of corrections stored in the lookup table.

FIG. 9 is a graph showing corrections Dc1 added to the current image data Di1 so as to cause the liquid crystal to reach the transmittance specified by the current image data Di1 within a one-frame interval. If the current image data have 8-bit gray-scale values, there are 256×256 different corrections Dc1 corresponding to combinations of the gray-scale values of the current image data and the preceding-frame image data. FIG. 9 is simplified to show 8×8 corrections corresponding to combinations of the gray-scale values.

As shown in FIG. 8, the liquid crystal response speed depends on the gray-scale values of the current image data and the preceding-frame image data, so the lookup table 11*d* stores 256×256 different corrections Dc1 corresponding to combinations of the gray-scale values of the current image data and the preceding-frame image data. The liquid crystal is particularly slow in responding to changes from an intermediate gray level (gray) to a high gray level (white). Therefore, the response speed can be improved effectively by setting the correction data dt(Di1, Dq0) corresponding to preceding-frame image data Dq0 representing an intermediate gray level and current image data Di1 representing a high gray level to large values. Since the response characteristics of liquid crystals vary according to the liquid crystal material, electrode shape, temperature, and so on, the response speed can be controlled according to the particular characteristics of the liquid crystal used by employing a display unit 11 supplied with corrections Dc1 corresponding to the usage conditions.

Figure 10:
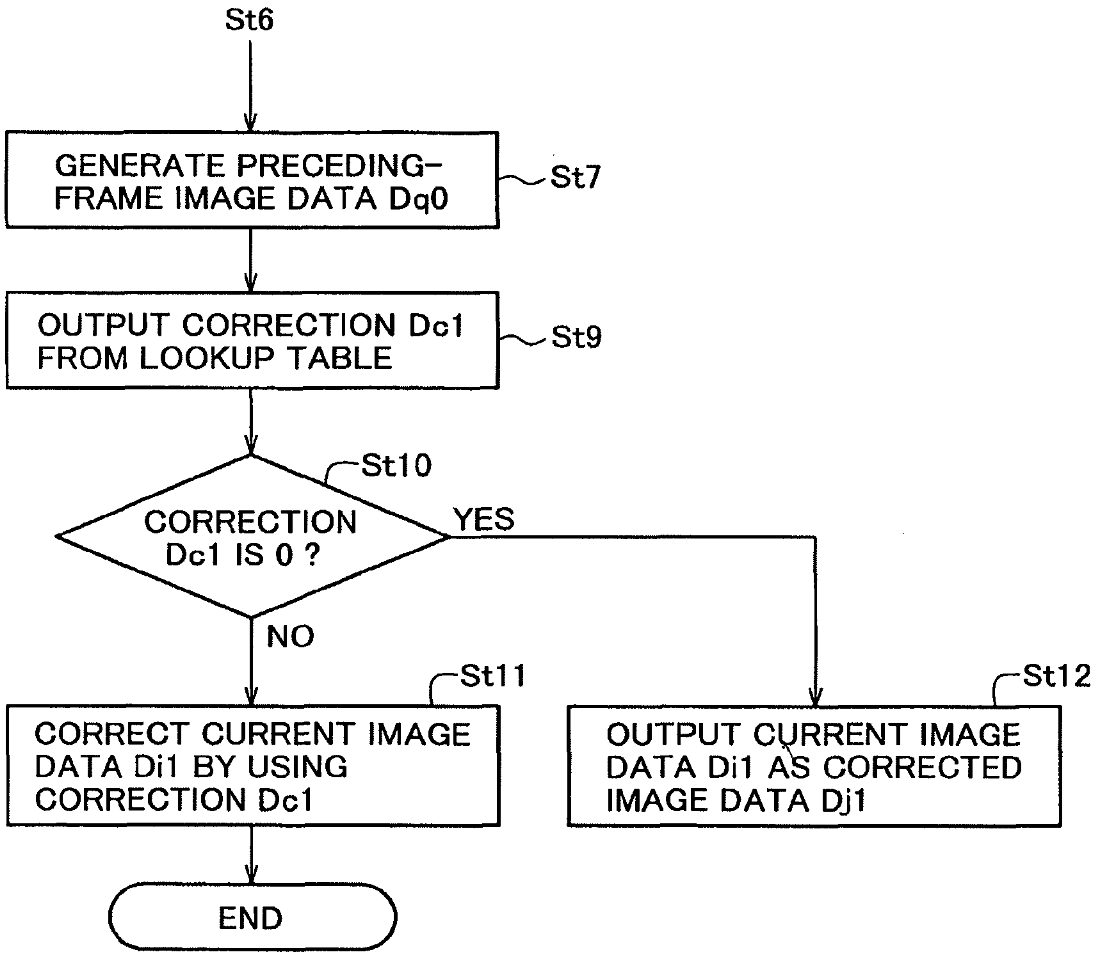
FIG. 10 is a flowchart illustrating the operation of a liquid-crystal-driving image processing circuit according to the present invention.

FIG. 10 is a flowchart illustrating the operation of a liquid-crystal-driving image processing circuit according to the second embodiment. The preceding-frame image data Dq1 are output through the procedure from St1 to St7, which is the same as in the first embodiment.

The image data correction circuit 10 reads the correction Dc1 (Di1, Dq0) corresponding to the current image data Di1 and preceding-frame image data Dq0 from the lookup table 11*d* (St9) and decides whether the correction Dc1 is zero (St10). If the correction Dc1 is not zero, the current image data Di1 is corrected by using the correction Dc1, and the corrected image data Dj1 is output (St11). If the correction Dc1 is zero, no correction is made, and the current image data Di1 is output as the corrected image data Dj1 (St12).

This procedure is carried out for each pixel of the current image data Di1.

The amount of calculation needed to output the corrected image data Dj1 can be reduced by obtaining the correction data Dc1 beforehand and storing the data in the lookup table 11*d*.

Figure 11:
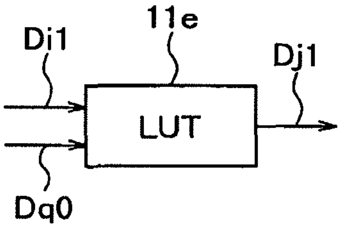
FIG. 11 is a block diagram showing an exemplary internal structure of the image data correction circuit.

FIG. 11 is a block diagram showing another example of the internal structure of the image data correction circuit 10 according to the second embodiment. The lookup table 11*e* shown in FIG. 11 receives the preceding-frame image data Dq0 and the current image data Di1 and outputs corrected image data Dj1(Di1, Dq0). The lookup table 11*e* stores the corrected image data Dj1(Di1, Dq0) obtained by adding the 256×256 different corrections Dc1(Di1, Dq0) as shown in FIG. 9. The corrected image data Dj1 are specified within the gray-scale range that can be displayed by the display unit 11.

Figure 12:
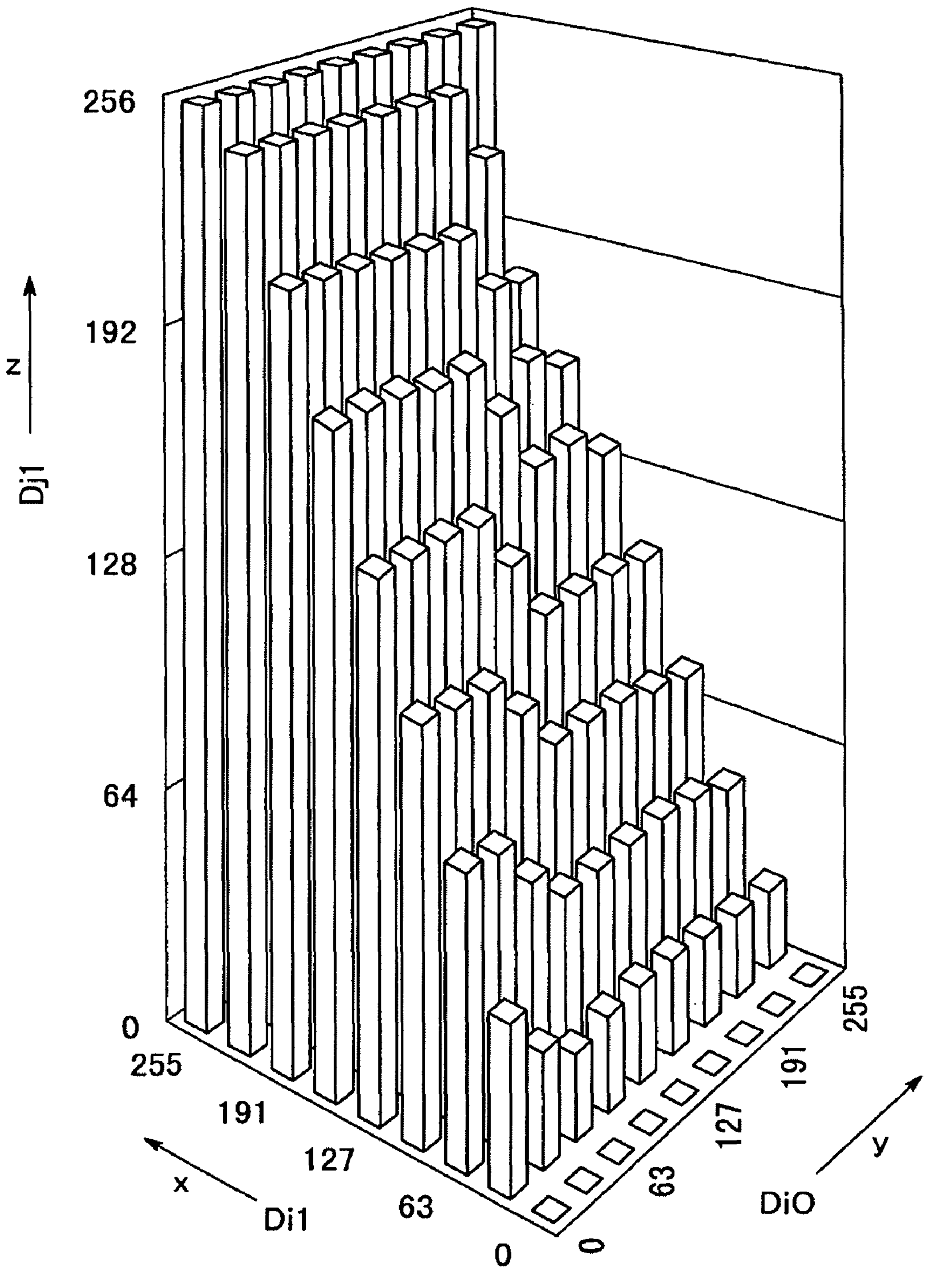
FIG. 12 is a drawing showing an example of corrected image data stored in the lookup table.

FIG. 12 is a drawing showing an example of corrected image data Dj1 stored in the lookup table 11*e*. If the current image data have 8-bit gray-scale values, there are 256×256 corrections Dc1 corresponding to combinations of the gray-scale values of the current image data and the preceding-frame image data. FIG. 12 is simplified to show 8×8 corrections corresponding to combinations of the gray-scale values.

The amount of calculation needed to output the corrected image data Dj1 can be reduced further by storing the corrected image data Dj1 in the lookup table 11*e* and outputting the corrected image data Dj1 in accordance with the current image data Di1 and the preceding-frame image data Dq0.

Third Embodiment

Figure 13:
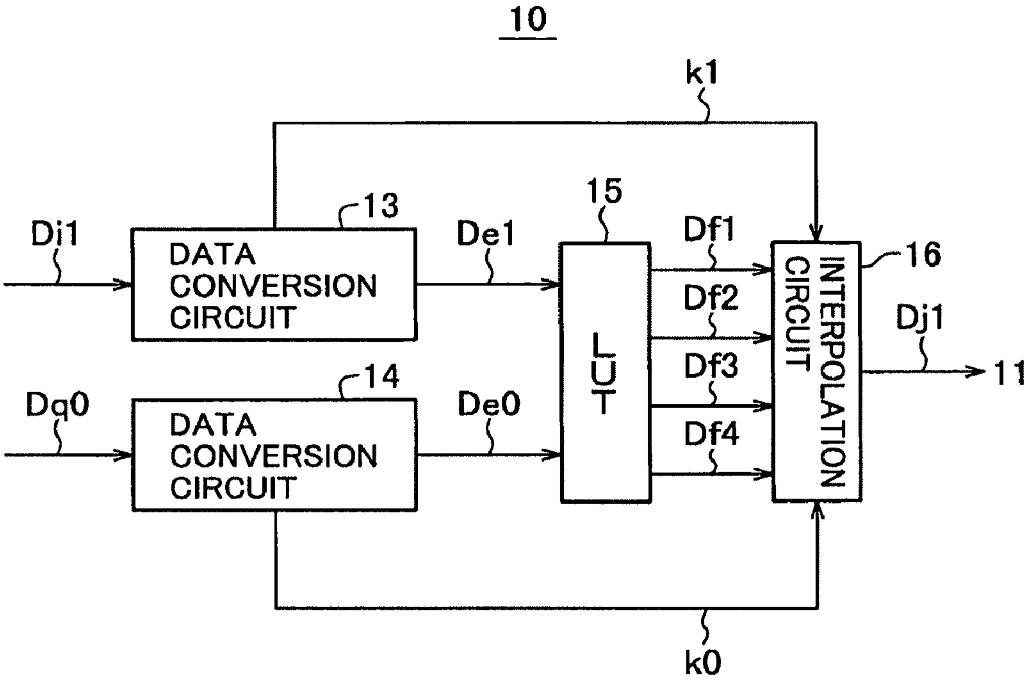
FIG. 13 is a block diagram showing an exemplary internal structure of the image data correction circuit.

FIG. 13 is a block diagram showing an exemplary internal structure of the image data correction circuit 10 of a third embodiment. Data conversion circuits 13, 14 receive the current image data Di1 and the preceding-frame image data Dq0 and output converted current image data De1 and converted preceding-frame image data De0, respectively, with the number of bits converted from eight to three, for example. At the same time, the data conversion circuits 13, 14 calculate respective interpolation coefficients k1 and k0, which will be described below. A lookup table 15 outputs four correction image data values Df1 to Df4 according to the current image data De1 and preceding-frame image data De0 with the reduced number of bits. An interpolation circuit 16 generates corrected image data Dc1 according to these correction image data values Df1 to Df4 and the interpolation coefficients k0 and k1.

Figure 14:
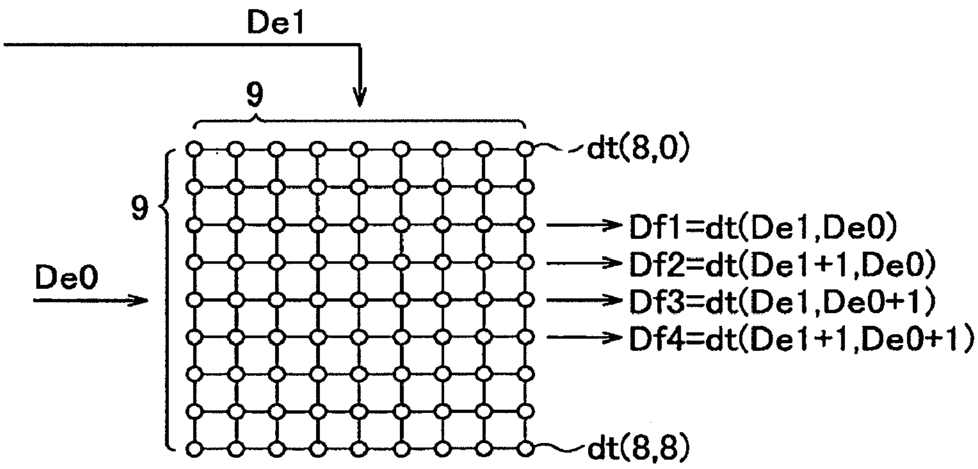
FIG. 14 is a schematic drawing showing the structure of the lookup table.

FIG. 14 is a schematic drawing showing the structure of the lookup table 15. The current image data De1 and preceding-frame image data De0 with the converted number of bits are three-bit image data (eight gray levels) taking values from zero to seven. The lookup table 15 has a 9×9 two-dimensional array of correction image data from which it outputs the correction image data value dt(De1, Db0) corresponding to the three-bit values of the current image data De1 and the preceding-frame image data De0 as the correction image data value Df1, and also outputs correction image data values dt(De1+1, De0), dt(De1, De0+1), and dt(De1+1, De0+1) from positions next to the correction image data value Df1 as correction image data values Df2, Df3, and Df4, respectively.

The interpolation circuit 16 uses the correction image data values Df1 to Df4 and the interpolation coefficients k1 and k0 to calculate the corrected image data Dj1 by equation (2) below.

$$Dj1=(1-k0)\times\{(1-k1)\times Df1+k1\times Df2\}+k0\times\{(1-k1)\times Df3+k1\times Df4\} \quad (2)$$

Figure 15:
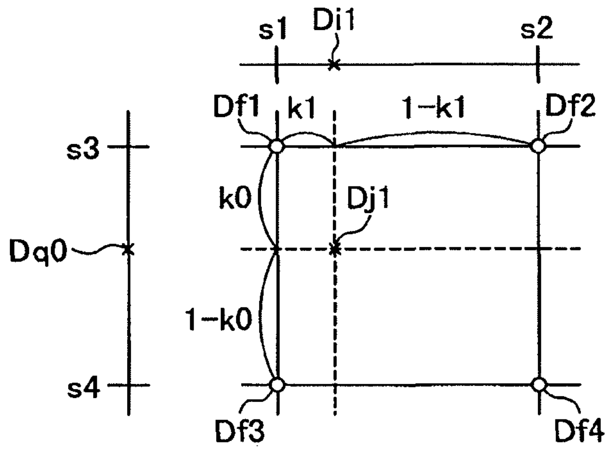
FIG. 15 is a drawing illustrating an interpolation operation.

FIG. 15 illustrates the method by which the correction Dc1 is calculated by equation (2) above. In FIG. 15, the values s1 and s2 are threshold values used when the number of bits of the current image data Di1 is reduced by data conversion circuit 13, and the values s3 and s4 are threshold values used when the number of bits of the preceding-frame image data Dq0 is reduced by data conversion circuit 14. Threshold value s1 corresponds to bit-reduced current image data De1, and threshold value s2 corresponds to bit-reduced current image data De1+1, which is one gray level greater than the current image data De1. Threshold value s3 corresponds to bit-reduced preceding-frame image data De0, and threshold value s4 corresponds to bit-reduced preceding-frame image data De0+1, which is one gray level greater than preceding-frame image data De0.

The interpolation coefficients k1 and k0 are calculated by equations (3) and (4) below:

$$k1=(Di1-s1)/(s2-s1) \quad (3)$$

where $s1<Di1\leqq s2$ $$k0=(Dq0-s3)/(s4-s3) \quad (4)$$

where $s3<Dq0\leqq s4$

Figure 16:
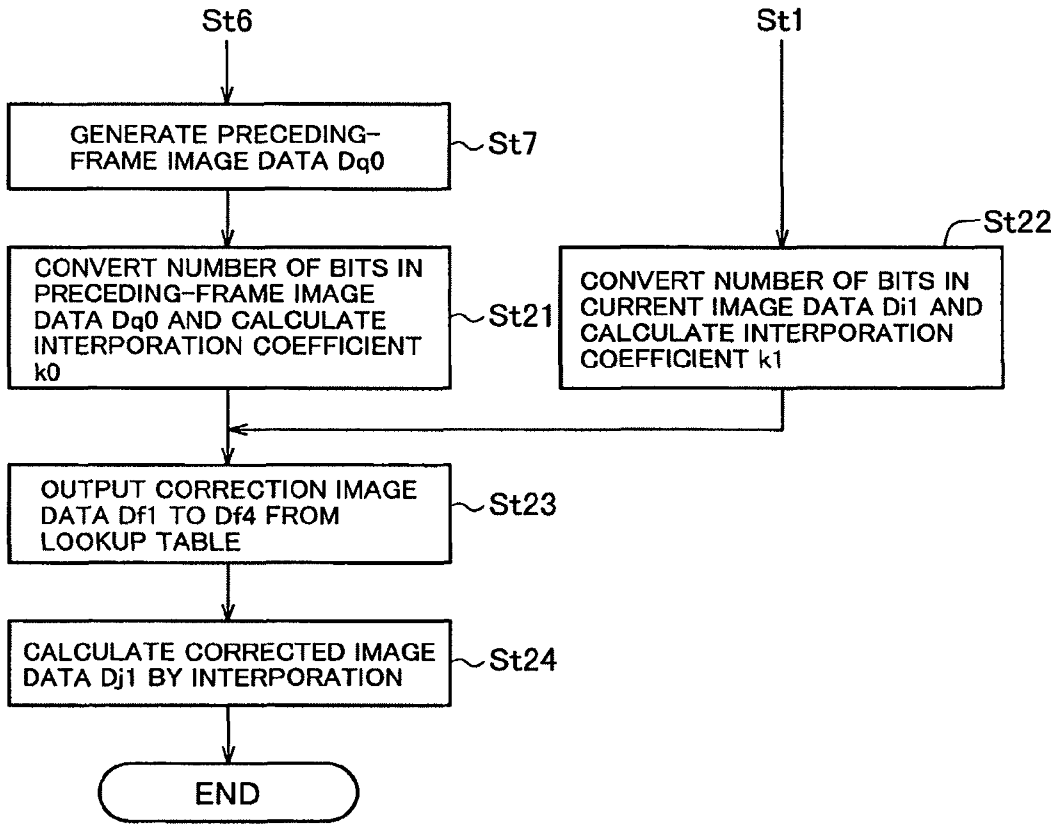
FIG. 16 is a flowchart illustrating the operation of a liquid-crystal-driving image processing circuit according to the present invention.

FIG. 16 is a flowchart illustrating the operation of a liquid-crystal-driving image processing circuit according to the third embodiment. The preceding-frame image data Dq1 are output through the same procedure as in the first embodiment, from step St1 to step St7.

Data conversion circuit 14 in the FIG. 10 reduces the number of bits of the preceding-frame image data Dq0, outputs the preceding-frame image data De0 with the converted number of bits, and calculates interpolation coefficient k0 by equation (4) (St21). Data conversion circuit 13 reduces the number of bits of the current image data Di1, outputs the current image data De1 with the converted number of bits, and calculates interpolation coefficient k1 by equation (3) (St22).

The lookup table 15 outputs the correction image data value Df1 corresponding to the bit-reduced preceding-frame image data De0 and current image data De1 and outputs the adjacent correction image data values Df2 to Df4 (St23). The interpolation circuit 16 calculates the corrected image data Dj1 according to the correction image data values Df1 to Df4 and the interpolation coefficients k0 and k1 by equation (2) (St24).

When the corrected image data Dj1 are obtained by interpolation from the four correction image data values Df1, Df2, Df3, and Df4, using the interpolation coefficients k0 and k1 that are calculated when the number of bits of the current image data Di1 and the preceding-frame image data Dq0 are converted as described above, the effect of quantization errors in the corrected image data Dj1 can be reduced.

The data conversion circuits 13, 14 are not limited to converting the number of bits to three; any number of bits with which the corrected image data Dj1 can be obtained through interpolation by the interpolation circuit 16 can be selected. Furthermore, only the number of bits of the current image data Di1 may be reduced, or only the number of bits of the preceding-frame image data Dq0 may be reduced.

The interpolation circuit 16 may also be structured so as to calculate the corrected image data Dj1 by using a higher-order interpolation function, instead of by linear interpolation.

Fourth Embodiment

Figure 17:
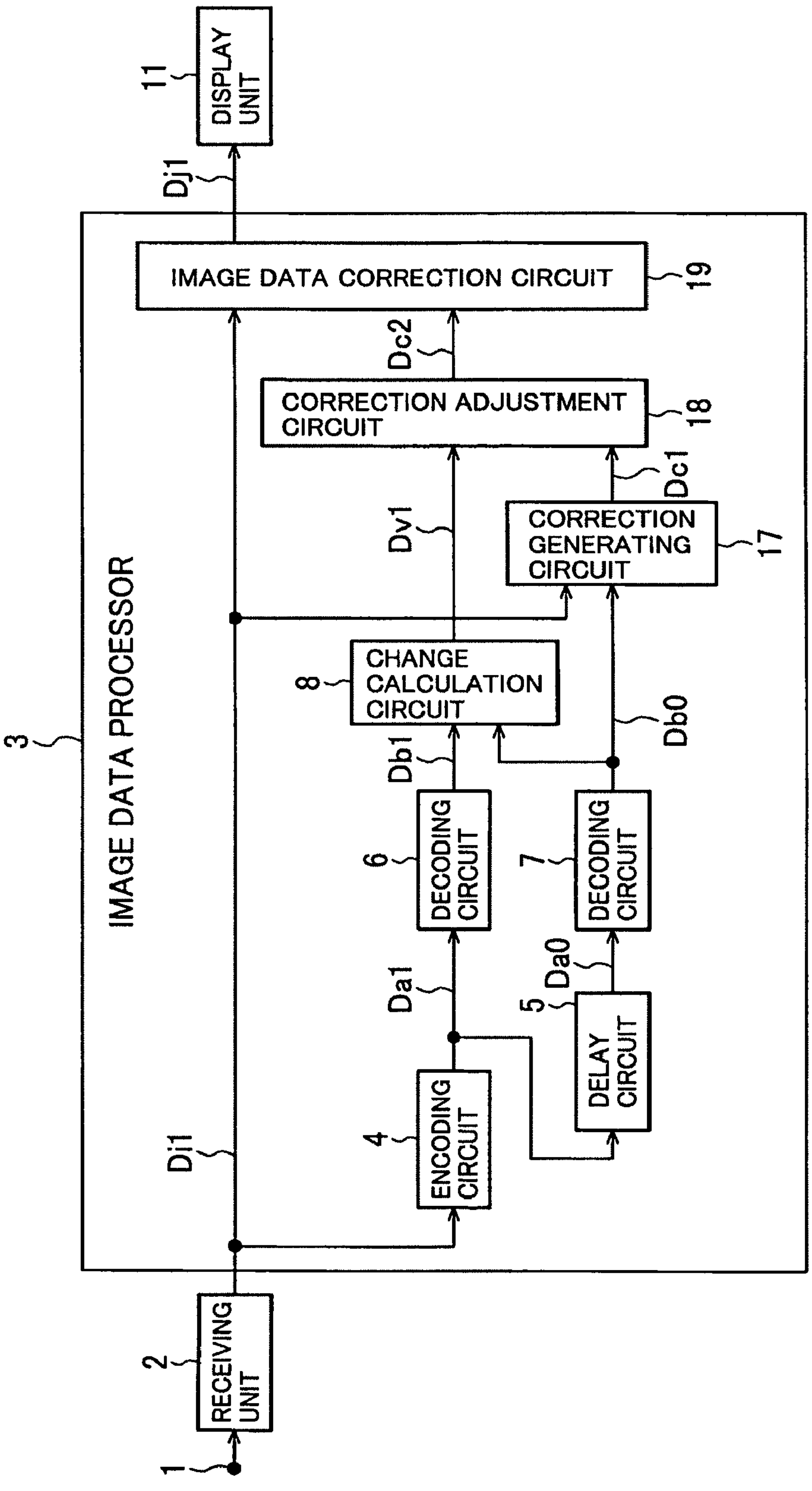
FIG. 17 is a block diagram showing another embodiment of a liquid-crystal-driving image processing circuit according to the present invention.

FIG. 17 is a block diagram showing another embodiment of the liquid-crystal-driving image processing circuit according to the present invention. The liquid-crystal-driving image processing circuit shown in FIG. 17 includes a correction generating circuit 17, a correction adjustment circuit 18, and an image data correction circuit 19.

The other elements are the same as in the liquid-crystal-driving image processing circuit according to the first embodiment, shown in FIG. 1.

The correction generating circuit 17 receives the decoded image data Db0 and the preceding-frame image data Di1 and outputs a correction Dc1 obtained from the two inputs. The correction Dc1 may be obtained by calculation as in the first embodiment or may be output from a lookup table as in the second embodiment.

The correction Dc1 is input to the correction adjustment circuit 18. The correction adjustment circuit 18 adjusts the correction Dc1 in accordance with the change Dv1 output from the change calculation circuit 8 and outputs an adjusted correction Dc2 to the image data correction circuit 19.

The decoded image data Db0 include encoding and decoding errors, so the correction Dc1 also includes error. When the change Dv1 is small, by limiting the value of the correction Dc1, the correction adjustment circuit 18 reduces the error in the correction Dc1 for pixels at which the image data do not change.

More specifically, the correction is adjusted by the following formula (5), using a coefficient k that varies as shown in FIG. 5:

$$Dc2=k\times Dc1 \quad (5)$$

The adjusted correction Dc2 output from the correction adjustment circuit 18 is input to the image data correction circuit 19. The image data correction circuit 19 corrects the current image data Di1 by using the adjusted correction Dc2.

Figure 18:
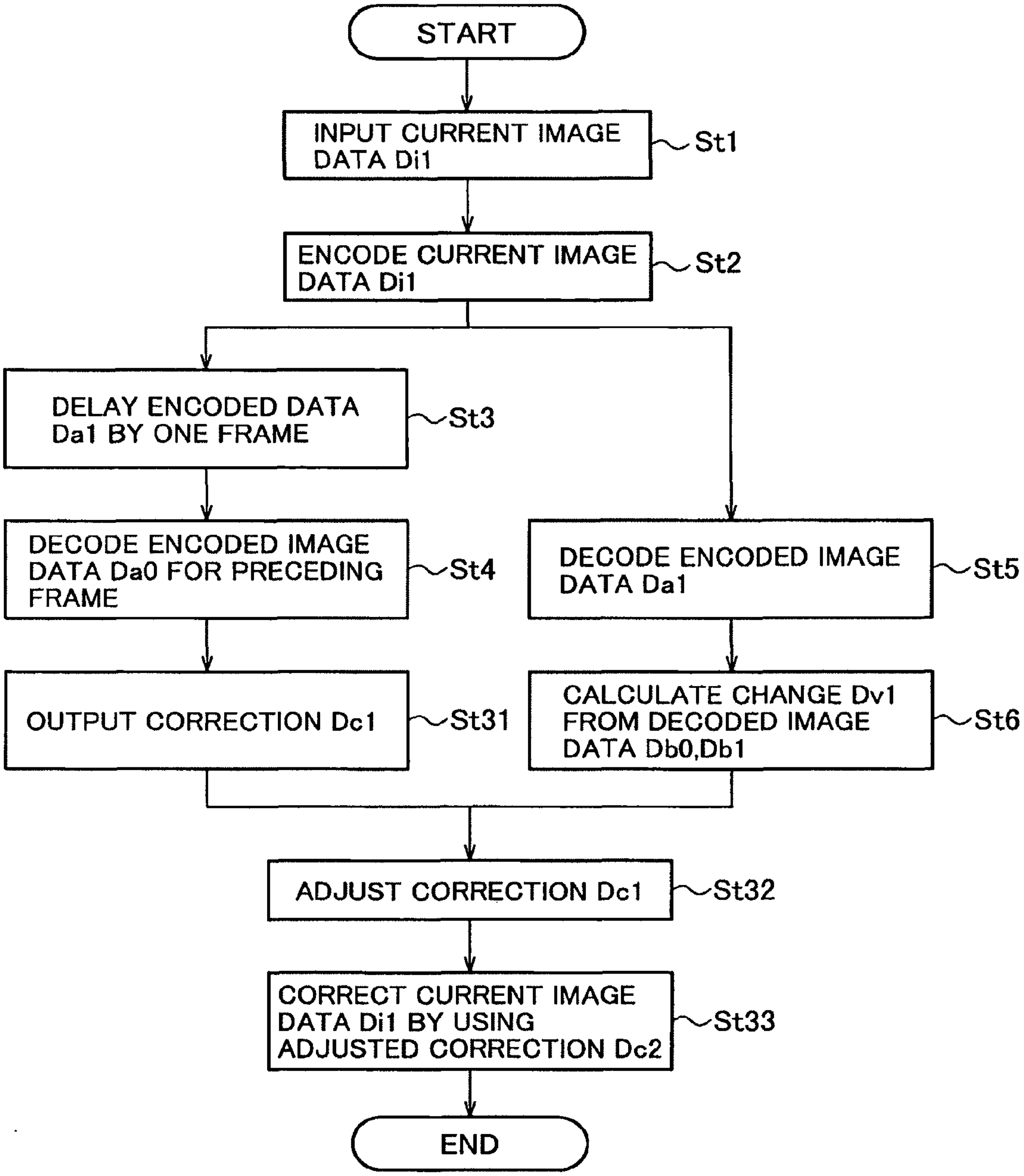
FIG. 18 is another flowchart illustrating the operation of a liquid-crystal-driving image processing circuit according to the present invention.

FIG. 18 is a flowchart illustrating the operation of the liquid-crystal-driving image processing circuit according to the fourth embodiment.

First, the current image data Di1 are input to the image data processor 3 (St1). The encoding circuit 4 encodes the input current image data Di1 and outputs encoded image data Da1 (St2). The delay circuit 5 delays the encoded image data Da1 by one frame interval and outputs encoded image data Da0 for the preceding frame (St3). The decoding circuit b7 decodes the encoded image data Da0 and outputs decoded image data Db0 corresponding to the current image data Di0 one frame before (St4). The correction generating circuit 17 outputs the correction Dc1 in accordance with the current image data Di1 and the decoded image data Db0 (St31).

In parallel with these steps, decoding circuit 6 decodes the encoded image data Da1 and outputs decoded image data Db1 corresponding to the current image data Di1 of the current frame (St5). The change calculation circuit 8 takes the difference between the decoded image data Db0 of the preceding frame and the decoded image data Db1 of the current frame pixel by pixel and outputs the absolute value of the difference as the change Dv1 (St6).

The correction adjustment circuit 18 adjusts the correction Dc1 in accordance with the change Dv1 and outputs the adjusted correction Dc2 (St32).

The image data correction circuit 19 corrects the current image data Di1 by using the correction Dc2 output from the correction adjustment circuit 18 and outputs the corrected image data Dj1 (St33).

This procedure is carried out for each pixel of the current image data Di1.

The liquid-crystal-driving image processing circuit according to the fourth embodiment obtains the correction Dc1 from the current image data Di1 and the decoded image data Db0 and limits the correction Dc1 in accordance with the change Dv1, which is the difference between the decoded image data Db0 of the preceding frame and the decoded image data Db1 of the current frame, making no correction when a still image is input but making corrections based on the change when moving images are input, so that appropriate voltages can be applied to the liquid crystal.

INDUSTRIAL APPLICABILITY

The liquid-crystal-driving image processing circuit or liquid-crystal-driving image processing method according to the first embodiment of the present invention obtains the difference between the first decoded image data and the second decoded image data pixel by pixel, selects either the image data of the current frame or the second decoded image data for each pixel in accordance with the difference, thereby generates preceding-frame image data, and corrects the gray-scale value of the image of the current frame in accordance with the preceding-frame image data and the current-frame image data, so that the liquid crystal response speed can be controlled appropriately without unnecessarily applying excess voltages, irrespective of whether a still or moving image is input.

The liquid-crystal-driving image processing circuit or liquid-crystal-driving image processing method according to the second embodiment of the present invention adjusts the correction for the gray-scale value of the image of the current frame in accordance with the difference between the first decoded image data and the second decoded image data, not making unnecessary corrections when a still image is input but making corrections when moving images are input, based on the changes therein, so that appropriate voltages can be applied to the liquid crystal.

What is claimed is:

1. A liquid-crystal-driving image processing circuit that receives image data corresponding to voltages applied to a liquid crystal, the image data indicating gray-scale values of pixels in an image, corrects the image data according to changes in the gray-scale values of the pixels, and outputs the corrected image data, comprising:

an encoding unit configured to encode the image data representing a current frame of the image, thereby outputting encoded image data corresponding to the image in the current frame;

a decoding unit configured to decode the encoded image data, thereby outputting first decoded image data corresponding to the image data of the current frame;

a delay unit configured to delay the encoded image data for an interval corresponding to one frame;

a decoding unit configured to decode the encoded image data output from the delay unit, thereby outputting second decoded image data corresponding to the image data one frame before the current frame;

a unit configured to take a difference between the first decoded image data and the second decoded image data for each pixel;

a unit configured to output corrections for correcting the gray-scale values of the image in the current frame according to the second decoded image data and the image data of the current frame;

a correction adjusting unit configured to adjust the corrections according to the difference between the first decoded image data and the second decoded image data; and a correction unit configured to correct the image data of the current frame according to the corrections output from the correction adjusting unit.

2. A liquid-crystal-driving image processing method wherein image data corresponding to voltages applied to a liquid crystal are received, the image data, indicating gray-scale values of pixels in an image, are corrected according to changes in the gray-scale values of the pixels, and the corrected image data are output, comprising:

encoding the image data representing a current frame of the image, thereby outputting encoded image data corresponding to the image in the current frame;

decoding the encoded image data, then outputting first decoded image data corresponding to the image data of the current frame;

delaying the encoded image data for an interval corresponding to one frame, then decoding the encoded image data and outputting second decoded data corresponding to the image data one frame before the current frame;

taking a difference between the first decoded image data and the second decoded image data for each pixel, outputting corrections for correcting the gray-scale values of the image in the current frame according to the second decoded image data and the image data of the current frame; and adjusting the corrections according to the difference between the first decoded image data and the second decoded image data, and correcting the image data of the current frame according to the adjusted corrections.

3. A liquid crystal display apparatus comprising the liquid-crystal-driving image processing circuit of claim 1.

* * * * *